W. E. WILLIAMS.
MACHINE AND METHOD FOR MANUFACTURING SHREDDED WHEAT CUP BISCUITS.
APPLICATION FILED SEPT. 17, 1908.
991,584. Patented May 9, 1911.
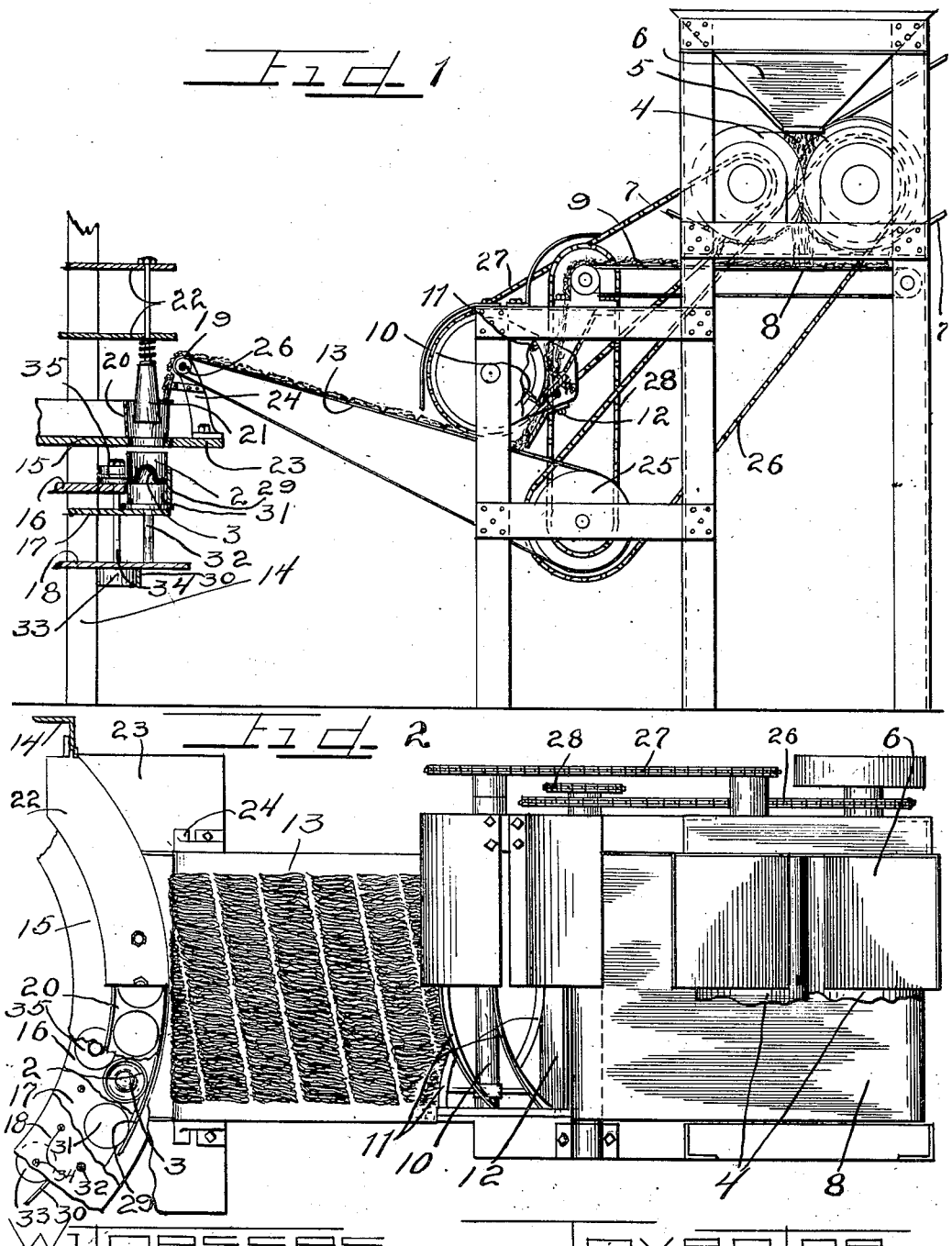

UNITED STATES PATENT OFFICE.

WILLIAM ERASTUS WILLIAMS, OF CHICAGO, ILLINOIS.

MACHINE AND METHOD FOR MANUFACTURING SHREDDED-WHEAT CUP-BISCUITS.

991,584.  Specification of Letters Patent.  Patented May 9, 1911.

Application filed September 17, 1908. Serial No. 453,459.

*To all whom it may concern:*

Be it known that I, WILLIAM ERASTUS WILLIAMS, a citizen of the United States, residing at Chicago, county of Cook, and State of Illinois, have invented a new and useful Improvement in a Machine and Method of Manufacturing Shredded-Wheat Cup-Biscuits, of which the following is a specification.

The object of my invention is to provide a machine and method whereby the shredded wheat cup biscuits may be made more uniform in size than has been heretofore possible with the machinery and methods heretofore known.

It has been difficult by machinery to make shredded wheat into the form of a cup shaped biscuit and get all the cups or biscuits of substantially the same size and density and when the cups so vary it is impossible to bake them on a commercial scale without burning the light weight ones before the heavy ones are fully baked and this causes a serious loss.

The shreds of wheat or other suitable material come from the shredding machine in a ribbon or mat of long threads that adhere together more or less irregularly and in separating the quantity for the different cups the interlacing of the shreds draws a larger portion from the delivery mechanism at some intervals than at others, thus producing the trouble. Further it is desirable that the cup biscuits be of even density on all sides of the rim as if one side is light it will burn on that side in baking. The long shreds hang together so that it is difficult by machinery to get them arranged evenly on all sides of the cup or baking forms to insure an even density of wall for the cup. But with the machinery and method here shown I overcome all the difficulties mentioned.

Reference will be had to the accompanying drawing in which:

Figure 1, is a side elevation of the machinery. Fig. 2 is a plan view with parts omitted for clearness of illustration.

In the drawing 2 indicates a baking form for a cup shaped biscuit which is a tin cup provided with a conical central projection 3 around which on the inside of the cup the shreds are disposed and held while being baked and the baking sets the shreds in form so that when they are discharged from the tin cups they retain the cup shape. This baking cup or form is shown and described in some former applications of mine in relation to this art.

4 indicates a pair of shredding rolls which produce shreds of the prepared grain 5 delivered to the machine from hopper 6. Instead of grain this material may be of any suitable form or composition. In place of the rolls there may be used any suitable shredding or threading device.

The material is removed from the rolls by the scrapers 7 and it falls in more or less long continuous shreds onto the carrier belt 8 which delivers them continuously in a mat or ribbon 9 to a rotary cutting device 10 provided with spiral cutting blades 11 working against a stationary knife 12 which cut the shreds into short lengths which then fall upon a carrier belt 13 which carries the cut material to the cup forming machine 14. This cup forming machine or cupping machine is the subject of another application already on file. This cupping machine consists of a carrier for the tin cups or forms of any suitable construction but I prefer to use a wheel here shown in section and constructed of plates, 15, 16, 17 and 18 secured together and mounted upon an axis not shown in the drawing and the wheel or carrier carries the tin cup forms past the delivery end 19 of the carrier belt 13.

Fixed to and moving with the form carrier there are a series of hoppers 20 which direct the discharge of the material as delivered by belt 13 into the tin cups or forms. Packing plungers 21 carried on a cross head 22 actuated to reciprocate in any suitable manner are provided to pack the material as it is delivered into the forms, or cups 2. The cups or forms 2 are revolved while being filled with the shreds by means of traveling belts 29 and 30. Belt 29 comes in contact with the cup or form itself and also with a series of disks 31 upon which forms 2 rest. Disks 31 are mounted upon spindles 32 revolving in apertures in the plates of the wheel or carrier. Belt 30 revolves rollers 33 on spindles 34 carrying rollers 35 which come into contact with the cups or forms 2 and assist in revolving them while the same are being filled. Any suitable means may be employed for driving these belts and any suitable means may be employed for revolving the cups or forms 2 while being filled. The stationary plate 23 supports the bearings 24 for the roller 26 over which the carrier belt 13 passes at the cupping machine but any suitable means of support for these parts may be used. Belt 13 passes over roller 25 and is driven thereby and roller 25 is driven by a chain 26 from the shredding rolls. The cutting device 10 is driven by a chain 27 from one of the shredding rolls. The carrier belt 8 is driven by chain 28 from the shaft of roller 25. Any suitable means may be used to drive these several mechanisms.

The operation is as follows: The material is reduced to webs or ribbons of shreds by the rolls and these webs or ribbons are then cut into short lengths or disconnected sections by the cutting device and it is then packed into the forms and while therein baked or dried sufficiently to retain the shape assumed in the forms. The separated and as it were disconnected shreds can thus be made to fill the cups or forms in approximate uniform degree of density and yet there is a sufficient degree of interlacing of the shreds to cause the cup biscuit to hang together when it is baked.

My invention is adapted to be used with any suitable cereal product and is not limited to wheat shreds although at the present time I prefer to use the wheat shreds but do not limit my invention to wheat.

While I have described a cup shaped shredded biscuit as being made by the method and machinery described herein, the same method and machinery is exactly adapted to make a round biscuit and other suitable shapes. Therefore, I have not limited myself to cup shape in the claims hereof.

What I claim is:

1. The combination with means for forming a ribbon-like mass of approximately parallel shreds, of means for dividing the shreds into short lengths, and means for rearranging the short shreds in biscuits of suitable form and giving them a multiplicity of widely divergent directions.

2. The method of making shredded biscuits which consists in forming the material into a mat of long moist shreds, dividing the mat into short lengths, rearranging the short shreds of the sections among themselves and forming the shreds of neighboring sections into a mass of new shape, and removing the moisture from the mass.

3. The method of making shredded biscuits which consists in forming the material into long moist shreds, dividing the shreds into short lengths, re-arranging the short shreds among themselves giving them new relative directions and forming them into masses of new shape and volume, and baking the masses.

4. The combination with devices for shredding material and delivering the shreds in a continuous mat, of means for cutting the mat into short sections, biscuit forms, and means for rearranging the short shreds by relative longitudinal and other displacements, in said forms.

5. The combination with shredding devices, of means for dividing the shreds delivered thereby into short lengths, means for rearranging and combining shreds of neighboring sections into which the shreds are divided to form masses of new shape, and means for condensing the new masses during their formation.

6. The combination of, means for forming material into shreds, means for cutting the shreds into short lengths, means for placing the cut shreds in forms, means for packing the shreds in the forms, means for revolving the forms.

7. A source of supply of the shreds, a revolving cutter for cutting the shreds into short lengths as they come from the source of supply, means for depositing the shreds in forms, means for revolving the forms while the shreds are being deposited, and means for packing the shreds into the forms.

8. The combination with a source of supply for shreds, of a carrier removing a continuous mass of shreds from said source, means for dividing said mass transversely into short lengths, forms adapted to receive and re-shape masses of the short shreds, means for recombining the short shreds of the masses in said forms and readjusting them relatively by longitudinal and other movement, and means for gently compacting the shreds as they are received in the forms.

9. The method of making shredded cereal biscuits which consists in forming the material into a ribbon-like mass of approximately parallel shreds, dividing the mass transversely into segments not materially longer than the diameter of the desired biscuits, and re-arranging the shred segments in biscuits having their constituent shreds non-parallel and running in various wide-divergent directions.

In witness whereof, I have hereunto subscribed my name in the city of Chicago, on this 3rd day of September, 1908, in the presence of two subscribing witnesses.

WILLIAM ERASTUS WILLIAMS.

Witnesses:
W. O. BREWSTER,
JOHN GRANT.